(12) United States Patent
Graves (10) Patent No.: US 7,886,548 B1
(45) Date of Patent: Feb. 15, 2011

(54) ATTACHABLE, PORTABLE COOLING SYSTEM

(76) Inventor: Daniel A. Graves, 704 S. 25th St., Capperas Cove, TX (US) 76522

( * ) Notice: Subject to any disclaimer, the term of this patent is extended or adjusted under 35 U.S.C. 154(b) by 3 days.

(21) Appl. No.: 12/573,920

(22) Filed: Oct. 6, 2009

(51) Int. Cl.
F25D 17/06 (2006.01)
(52) U.S. Cl. ............................... 62/93; 62/272; 62/293
(58) Field of Classification Search .............. 62/93, 62/272, 293, 404, 406, 419, 426, 457.1, 457.2; 454/91, 92, 306, 903; 220/574.2, 915.2; 24/16 R, 68 PP, 168, 455
See application file for complete search history.

(56) References Cited

U.S. PATENT DOCUMENTS

| 2,109,310 | A | | 2/1938 | Cordrey |
| 2,724,951 | A | | 11/1955 | Arce |
| 2,749,725 | A | | 6/1956 | Essman et al. |
| 2,760,354 | A | | 8/1956 | Brady et al. |
| 3,636,566 | A | * | 1/1972 | Sutherland .................. 2/69.5 |
| 3,936,283 | A | * | 2/1976 | Solis .......................... 96/222 |
| 3,961,496 | A | | 6/1976 | Ku |
| 5,046,329 | A | | 9/1991 | Travis, III |
| 5,197,301 | A | | 3/1993 | Holcomb |
| 5,369,964 | A | * | 12/1994 | Mauer et al. ................. 62/420 |
| 5,375,421 | A | * | 12/1994 | Hsieh ........................... 62/3.4 |
| 5,548,967 | A | * | 8/1996 | Ghiraldi ........................ 62/99 |
| 5,606,865 | A | | 3/1997 | Caron |
| 5,685,165 | A | | 11/1997 | Bigelow, Jr. |
| 5,715,698 | A | * | 2/1998 | Calton ......................... 62/309 |
| 5,716,095 | A | * | 2/1998 | Lopez .................... 297/184.13 |
| 5,737,938 | A | | 4/1998 | Liu |
| 5,762,129 | A | | 6/1998 | Elliott |
| 5,797,833 | A | * | 8/1998 | Kobayashi et al. ............ 600/22 |
| 5,943,716 | A | * | 8/1999 | Chu .............................. 5/423 |
| 6,027,137 | A | * | 2/2000 | Rura ........................... 280/650 |
| 6,105,168 | A | * | 8/2000 | Hazen ........................... 2/69.5 |
| 6,336,341 | B1 | | 1/2002 | McGraw et al. |
| 6,427,476 | B1 | | 8/2002 | Eddins |
| 6,428,098 | B1 | * | 8/2002 | Allbaugh ................. 297/219.12 |
| 6,439,521 | B1 | * | 8/2002 | Wilson et al. ............. 248/227.3 |
| 6,464,468 | B2 | * | 10/2002 | Colburn ....................... 417/234 |
| 6,497,424 | B2 | * | 12/2002 | Gartner et al. ............. 280/47.4 |
| 6,571,568 | B1 | | 6/2003 | Link |
| 7,183,929 | B1 | * | 2/2007 | Antebi et al. ............. 340/573.1 |
| 7,188,489 | B2 | | 3/2007 | Martello |
| 7,231,777 | B1 | * | 6/2007 | Arnold et al. ............... 62/259.3 |
| 7,246,505 | B2 | | 7/2007 | Navedo et al. |
| 7,359,527 | B2 | * | 4/2008 | Breed et al. .................. 382/100 |
| 7,395,676 | B2 | * | 7/2008 | White .......................... 62/310 |

(Continued)

*Primary Examiner*—Mohammad M Ali
(74) *Attorney, Agent, or Firm*—Montgomery Patent and Design; Robert C. Montgomery (57) ABSTRACT

A portable cooling system for use in conjunction with child carriages incorporating a reservoir of ice and a water pump that directs chilled water through a dehumidifying radiator located in an air handler assembly is herein disclosed. The water continues to circulate through two (2) cooling radiators and returns to the ice and water reservoir by gravity. An electric fan blows air through the radiators where it is dehumidified by the first radiator and cooled by the next two (2) radiators. The air then continues through the air handler wherefrom it is directed toward the child through a flexible duct. A rechargeable battery system is used to power the operation of both the pump and the fan through separate switches. Such an arrangement allows the user to run just the fan for ventilation if cooling is not needed. The cooling system is carried upon the rear of a baby carriage in a stable manner.

14 Claims, 8 Drawing Sheets

U.S. PATENT DOCUMENTS

| | | | |
|---|---|---|---|
| 7,673,473 B2 * | 3/2010 | Tsuchiya | 62/434 |
| 7,748,235 B1 * | 7/2010 | Franklin et al. | 62/420 |
| 7,805,985 B2 * | 10/2010 | Friedl et al. | 73/114.45 |
| 7,814,764 B1 * | 10/2010 | Heater et al. | 62/476 |
| 2002/0017108 A1 * | 2/2002 | Schooley | 62/240 |
| 2002/0195851 A1 * | 12/2002 | Kassai et al. | 297/250.1 |
| 2003/0230109 A1 * | 12/2003 | Link | 62/420 |
| 2004/0025531 A1 * | 2/2004 | Holloman-Hughes et al. | 62/457.7 |
| 2004/0045308 A1 * | 3/2004 | Field et al. | 62/237 |
| 2005/0034476 A1 * | 2/2005 | Pohr | 62/420 |
| 2006/0053819 A1 * | 3/2006 | Wu et al. | 62/298 |
| 2006/0082183 A1 * | 4/2006 | Hudson | 296/77.1 |
| 2006/0098961 A1 * | 5/2006 | Seutter et al. | 392/383 |
| 2006/0185819 A1 * | 8/2006 | Bourgault et al. | 165/47 |
| 2007/0044503 A1 * | 3/2007 | McCarrell | 62/420 |
| 2007/0096446 A1 * | 5/2007 | Breed | 280/735 |
| 2007/0180840 A1 * | 8/2007 | Shostack | 62/186 |
| 2008/0084040 A1 * | 4/2008 | McGowan | 280/47.38 |
| 2009/0033118 A1 * | 2/2009 | Gomez | 296/37.4 |

* cited by examiner

ATTACHABLE, PORTABLE COOLING SYSTEM

RELATED APPLICATIONS

The present invention was first described in a notarized Official Record of Invention on Sep. 15, 2008, that is on file at the offices of Montgomery Patent and Design, LLC, the entire disclosures of which are incorporated herein by reference.

FIELD OF THE INVENTION

The present invention relates generally to portable cooling systems, and in particular, to a portable cooling device for regulating air temperature in infant strollers and the like.

BACKGROUND OF THE INVENTION

Strollers are one of the most common methods of transportation for infants and other young children. Many parents rely on strollers to enable them to walk long distances or enjoy the outdoors without having to leave their children behind. However, it is well known that very young children are comparatively delicate and sensitive to their environment. Extreme weather and temperature conditions can aggravate a child, leading to discomfort, complaining, and crying. This in turn affects the quality of the adult's experience as well. Furthermore, such conditions can actually pose physical hazards to children of that age. Young children are far more susceptible to sickness and disease as a result of drastic weather conditions, especially if unprotected. While cold weather conditions can be accounted for by means of blankets and extra clothing, it can be very difficult to counteract the effects of extreme heat.

Various attempts have been made to provide for a means of portable cooling. Examples of these attempts can be seen by reference to several U.S. patents. U.S. Pat. No. 2,724,951, issued in the name of Arce, describes a liquid cooling device. The Arce device utilizes insulated compartments and cooled water to lower the internal temperature of its compartments. U.S. Pat. No. 5,197,301, issued in the name of Holcomb, describes a portable device with an integral fan designed to propel cooled air in the vicinity of the device. The Holcomb device houses an internal compartment for containing frozen material, which in turn cools the air internally before it is expelled by the fan. U.S. Pat. No. 7,188,489, issued in the name of Martello, describes a portable air conditioning device with a low-output power source. The power source runs a fan which expels internally cooled air.

While these devices fulfill their respective, particular objectives, each of these references suffer from one or more disadvantages. Such devices are only able to cool quantities enclosed within the device. Also, such devices which are capable of external cooling are not suited for the cooling of a particular targeted external area. Also, such devices are bulky in construction and inconvenient to rearrange or move upon assembly at a desired location. Also, such devices use cooling methods that are difficult or inconvenient to sustain for long periods, and require continued energy or replacement of the cooling substance. Furthermore, such devices are not suited to adapt or attach to mobile devices such as strollers. Accordingly, there exists a need for a portable cooling system without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need to provide portable cooling in a manner which is simple, effective, easy to maintain and operate, and which provides sufficient adaptability, attachability, and mobility. Thus, the object of the present invention is to solve the aforementioned disadvantages and provide for this need.

To achieve the above objectives, it is an object of the present invention to provide a container comprising a cold compartment having chilled water stored within.

Another object of the present invention is to provide an air handler comprising a plenum and a duct connected to the plenum. The air handler also includes an affixed bracket and clamp which are designed to be removably mated to a child carriage. The duct includes an integral duct collar on the end apart from the plenum.

Yet still another object of the present invention is to provide a plenum connected to the container. The plenum contains a dehumidifier and a plurality of cooling radiators located with the plenum.

Yet still another object of the present invention is to provide a fan which is positioned between the dehumidifier and cooling radiators. It is the purpose of this fan to direct air into the duct for external expulsion.

Yet still another object of the present invention is to provide a pump and supply line, which extend from the cold compartment of the container to the plenum. This is for the purpose of circulating chilled water from the cold compartment to the dehumidifier and radiators in order to remove moisture from hot ambient air which is drawn in the plenum by the fan.

Yet still another object of the present invention is to provide a return line which extends from the plenum to the cold compartment. The return line is intended to return chilled water to the cold compartment by means of gravity. The dehumidified and cooled air is directed into the duct by means of the integral fan.

Yet still another object of the present invention is to provide a cooled blanket comprised of a cushion and an inlet and outlet combination. The cushion is adapted to be removably positioned on a child carriage.

Yet still another object of the present invention is to provide an integral cooling coil in fluid communication with the inlet and outlet of the cooled blanket. The purpose of this is to circulate chilled water from the supply line through the cooling coil of the blanket prior to entering the dehumidifying radiator.

Yet still another object of the present invention is to provide a method of utilizing the system which provides portable cooling in a unique manner which is simple, effective, easy to maintain and operate, and which provides the user with sufficient adaptability, attachability, and mobility.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

| DESCRIPTIVE KEY | |
| --- | --- |
| 10 | portable cooling system |
| 11 | container |
| 12 | strap |
| 13 | lid |
| 14 | battery pack |
| 15 | battery access flap |
| 16 | fan switch |
| 17 | pump switch |
| 18 | charging port |
| 21 | fan plug |
| 22 | storage bin |
| 23 | water supply line |
| 24 | water return line |
| 25 | pump |
| 27 | cold compartment |
| 28 | fan power line |
| 29 | pump power lead |
| 31 | universal bracket |
| 33 | drain |
| 34 | strap attachment |
| 35 | cooler |
| 36 | pump plug |
| 37 | male disconnect |
| 38 | female disconnect |
| 40 | air handler |
| 41 | plenum |
| 42 | dehumidifying radiator |
| 43 | fan |
| 44 | cooling radiator |
| 45 | fan receptacle |
| 46 | flexible duct |
| 47 | fastener |

| DESCRIPTIVE KEY -continued | |
| --- | --- |
| 48 | wing nut |
| 49 | flexible duct collar |
| 60 | water-cooled blanket embodiment |
| 61 | cushion |
| 62 | inlet |
| 63 | outlet |
| 64 | cooling coil |
| 70 | alternate embodiment |
| 71 | enclosure |
| 72 | bracket |
| 73 | power receptacle |
| 75 | cold chest |
| 81 | ice |
| 82 | water |
| 84 | clamp |
| 85 | handle |
| 88 | tray |
| 89 | mounting aperture |
| 90 | slotted aperture |
| 91 | clamping aperture |
| 94 | child carriage |
| 95 | foldable top |

DETAILED DESCRIPTION OF THE PREFERRED EMBODIMENT

The best mode for carrying out the invention is presented in terms of its preferred embodiment, herein depicted within FIGS. 1 through 5 and in terms of an alternate embodiment herein depicted within FIGS. 6a through 8. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an integrated portable air cooling system (herein described as the "system") 10, which provides a means for providing dehumidified and cooled air to the inside space of a child carriage 94 or to the interior of other such confined personal spaces, such as wheelchairs, mopeds, and golf carts.

Figure 1:
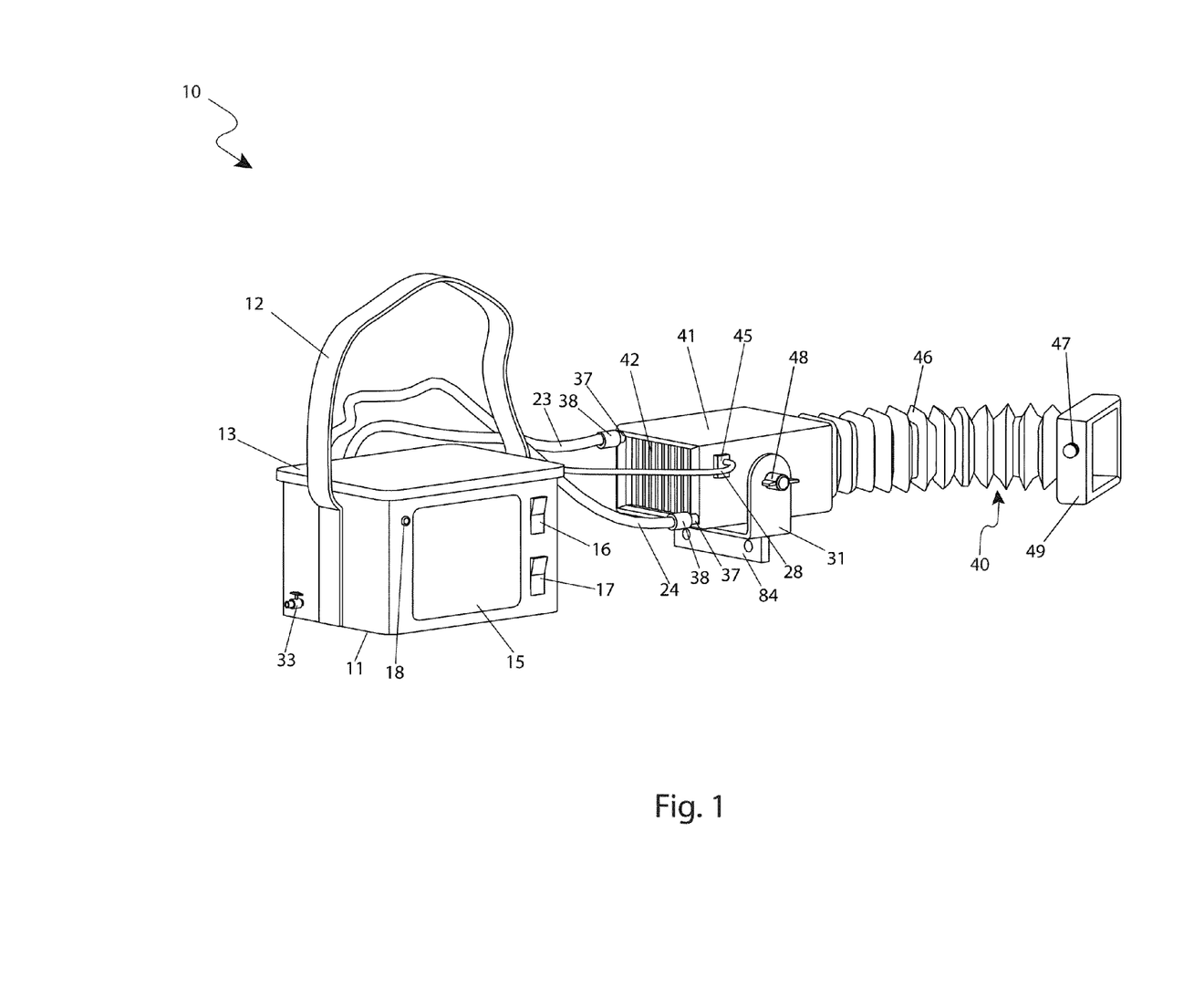
FIG. 1 is a perspective view of an integrated portable air cooling system 10, according to a preferred embodiment of the present invention.

Referring now to FIG. 1, a perspective view of the integrated air cooling system 10, according to the preferred embodiment of the present invention, is disclosed. The system 10 comprises a container 11 made of materials such as, but not limited to: rigid or semi rigid plastic, heavy duty canvas over a metal frame, fiberglass or aluminum. Said container 11 is covered by a lid 13 made of similar material as the container 11, which encloses a cold compartment 27 comprising a double wall with a water and abrasion resistant inner wall and a foam or fibrous insulating material filling the space between the two (2) walls. The container 11 also houses a battery pack 14 covered by a flap 15 which is closed by means such as, but not restricted to: a zipper, a hook-and-loop closure, snaps, quarter turn fasteners, a latch, or a ZIPLOCK® closure. Additionally, the container 11 also comprises an accessory storage bin 22. A strap 12 allows the system to be carried easily and is attached thereonto external opposing side walls of the container 11. The integrated system 10 also includes an air handler 40 which comprises a plenum 41 made of rigid plastic material with a smooth outside surface and rounded corners, a surface-mounted two-pin fan power receptacle 45, a flexible duct 46, a wing nut 48, a duct collar 49 bonded to the end said flexible duct 46 and comprising a fastener 47 envisioned to be, but not limited to: a snap or a hook-and-loop strip. The flexible duct 46 is envisioned to be manufactured materials such as, but not limited to: plastic, rubber, or canvass. A "U"-shaped universal bracket 31, made of either metal or plastic and comprising a clamp 84 allows the air handler 40 to be affixed and fastened to any part of a frame structure of a child carriage 94 or other member of a personal space enclosure by the integrally fixed clamp 84 or by any other suitable members of firm attachment such as, but not limited to: straps, snaps, hook-and-loop or individual spring clips, which members are bonded, riveted, bolted or screwed directly to the back face of said "U"-shaped universal bracket 31. The fastener 47 is intended for securing the position of the flexible duct 46 by providing a means of attaching the flexible duct collar 49 directly onto a desirable location within the child carriage 94, or indirectly by means of a member such as, but not restricted to: a strap, a clip, a bracket or a brace. Said fastener 47 can be made in any configuration such as, but not restricted to: a snap, a patch of hook-and-loop material, a button, a clip, or a safety pin.

Figure 2:
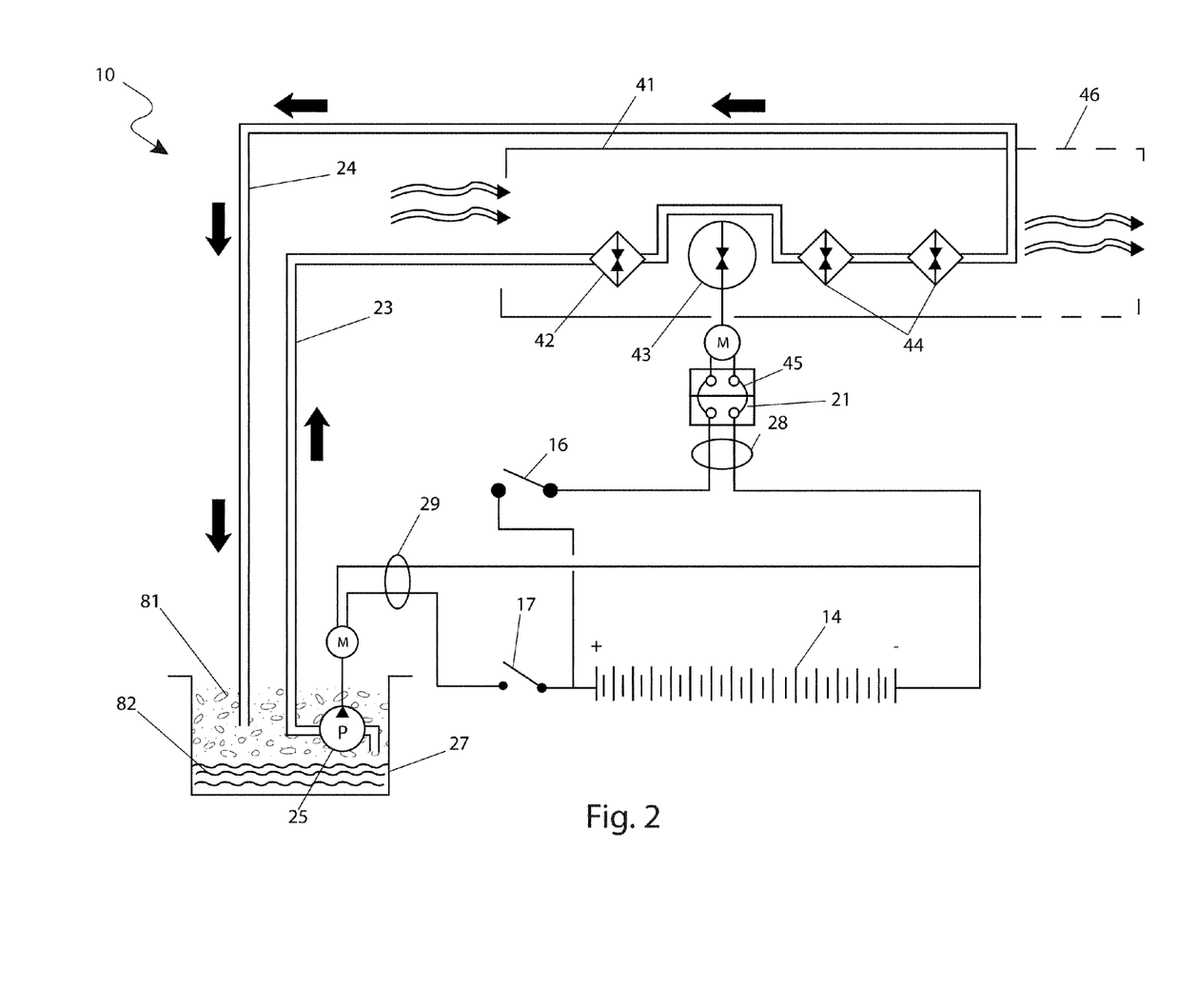
FIG. 2 is a schematic view of the integrated portable air cooling system 10, according to the preferred embodiment of the present invention.

Referring now to FIG. 2, a schematic view of the system 10 according to the preferred embodiment of the present invention, is disclosed. The insulated cold compartment 27 designed as a receptacle for ice 81 and a holder of chilled water 82 underneath the ice 81, comprises a pump 25 which circulates said chilled water 82 from the bottom portion of the cold compartment 27 to a dehumidifying radiator 42 and to a pair of cooling radiators 44 which are comprised within the air handler 40. The pump 25 conveys the chilled water 82 by means of a supply line 23 to the dehumidifying radiator 42, designed to remove moisture from the hot ambient air drawn into the plenum 41 by the action of a fan 43. From the dehumidifying radiator 42, the water proceeds through a pair of cooling radiators 44 connected in series. The dehumidified air is cooled by being moved through said radiators 44 by the action of the fan 43, whereby the heat from the air is transferred to the circulating chilled water 82. After exiting the second cooling radiator 44 the water 82 returns to the cold compartment 27 by gravity through a return line 24, and the dehumidified and cooled air is directed into the child carriage 94 or other type of confined personal space through the flexible duct 46. The water supply line 23 and the water return line 24 are envisioned to be made of a soft flexible tubing material such as, but not limited to: state-of-the-art surgical tubing, TYGON®, polyethylene, polypropylene, or rubber. One (1) disconnectable end of any water 82 circulation line 23, 24, 62 and 63 comprises a male disconnect 37, while the corresponding disconnectable end of said water 82 circulation lines 23, 24, 62 and 63 comprises a female disconnect 38. These disconnects are envisioned as, but not limited to: matching pairs of quick-disconnects, compression fittings, or quarter-turn bayonet type connectors.

Figure 3:
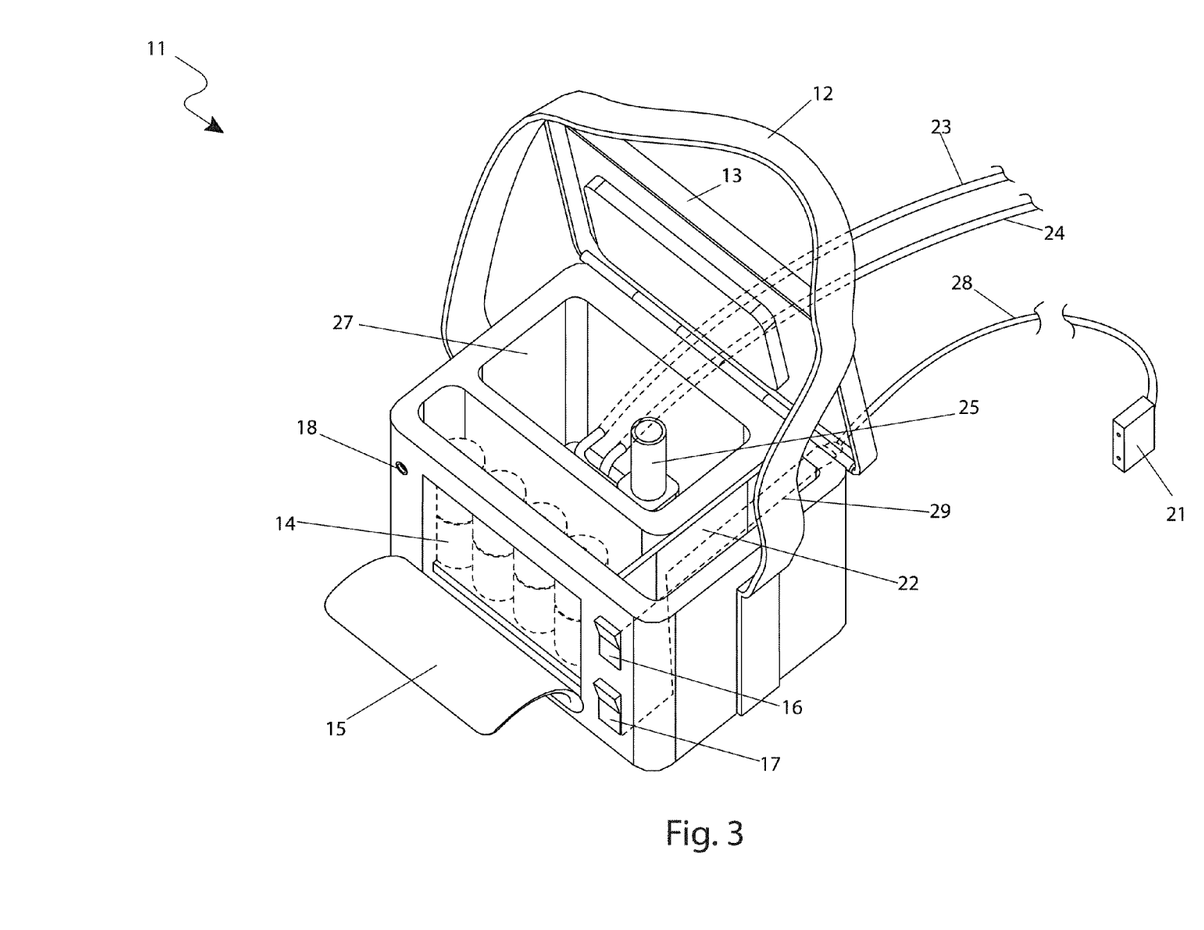
FIG. 3 is a top perspective view of a container for the integrated portable air cooling system 10, according to the preferred embodiment of the present invention.

Referring now to FIG. 3, a perspective top view of the cooling portion of the system 10 according to the preferred embodiment of the present invention, is disclosed. This figure illustrates an arrangement of the various components comprised within the container 11 which comprises the cold compartment 27, the pump 25 comprised within said cold compartment 27, and the lid 13 shown in an open position, wherein said lid 13 is designed to keep an interior of the container 11 isolated from an outside environment to prevent contamination. The pump 25 is envisioned to be, but not restricted to, a positive type displacement model. The container 11 further comprises a battery pack 14, the battery access flap 15 shown in the open state, the pump on-off switch 16, the fan on-off switch 17, the charging port 18, a storage bin 22, a cold water supply line 23, a water return line 24, and the fan power supply line 28. The battery pack 14 provides the motive electric power for the water circulating pump 25 and for the air moving fan 43 (see FIG. 2). A charging port 18 provides a receptacle means for a plug portion of a battery charging device, whereby a battery charging current is provided by a source such as, but not limited to: a solar array, a state-of-the-art 110 Volt AC/12 Volt DC converter, a 12 Volt automotive adapter, or an appropriate battery recharger.

Figures 4A, 4B:
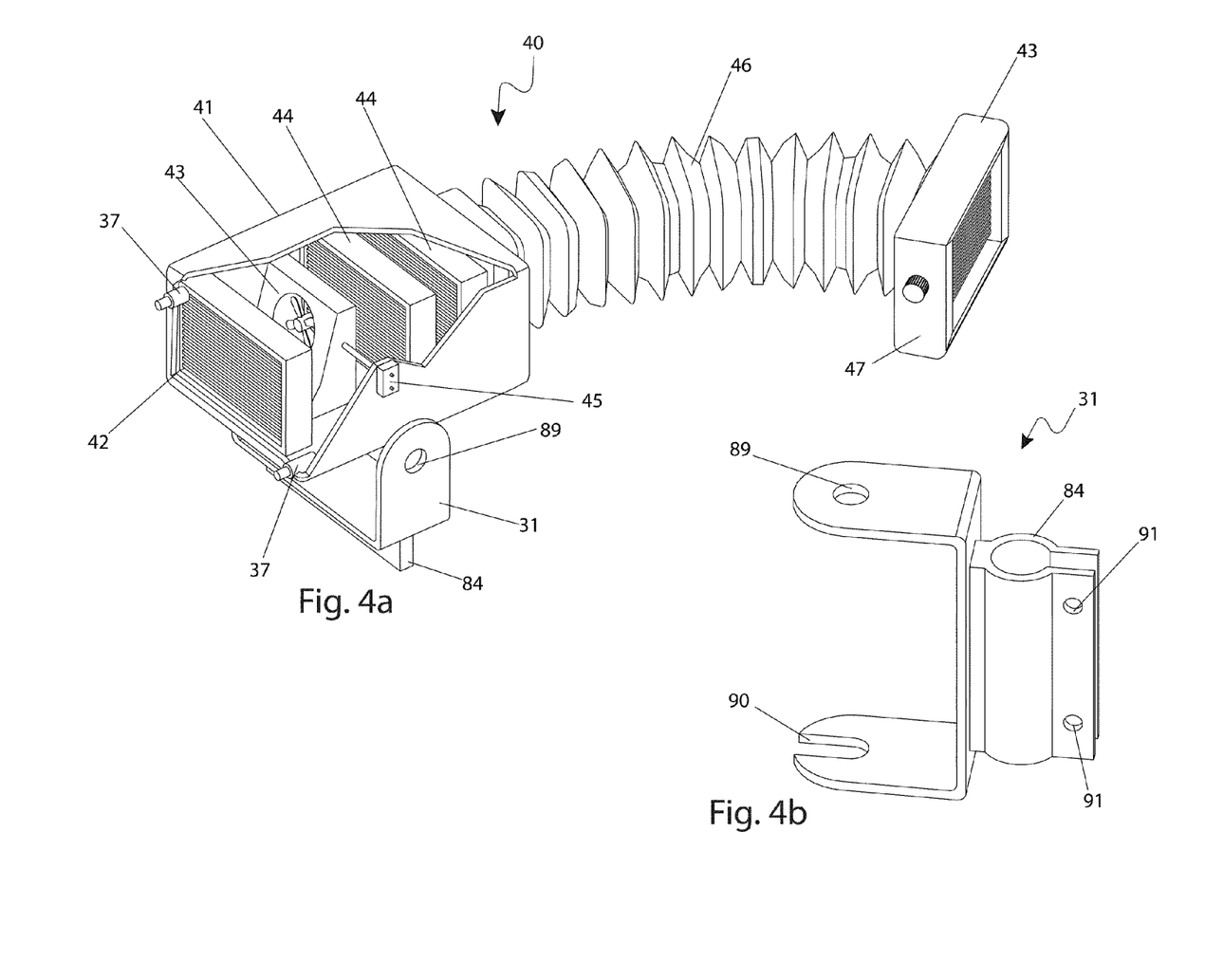
FIG. 4a is a perspective partially cut-away view of an air handler 40 as part of the portable air cooling system 10, according to the preferred embodiment of the present invention.
FIG. 4b is a perspective cut away view of an air handler universal bracket 31 as a part of the portable air cooling system 10, according to a preferred embodiment of the present invention.

Referring now to FIG. 4a, a perspective view of an air handler portion 40 of the system 10 according to the preferred embodiment of the present invention, is disclosed. The view is shown as partially cut away in order to reveal the internal components of said air handler 40 which comprises a plenum 41, a dehumidifying radiator 42, and an air moving fan 43 similar in design to the small cooling fans used in keeping electronic components and electrical controls from overheating. The plenum 41 also comprises a pair of cooling radiators 44 operating in a series configuration and shown mounted in tandem. The exterior elements of the air handler 40 comprise a surface-mounted two-pin low voltage receptacle 45 intended to conduct the electric power to the fan 43, the flexible duct 46 to adjustably direct the dehumidified and cooled air into the child carriage 94 or other confined personal space, the flexible duct collar 49, and the fastener 47. The inlet of the dehumidifying radiator 42 is provided with a tubing male disconnect 37, intended to provide an easy connection with the water supply line 23 tubing by means of the female disconnect 38 (see FIG. 1). Likewise, the water return line 24 from the radiator 44 is provided with a male disconnect 37 to provide an easy connection to the water return line 24 tubing.

Referring now to FIG. 4b, a perspective view of a "U"-shaped universal bracket portion 31 of the system 10 according to the preferred embodiment of the present invention, is disclosed. The back surface of said universal bracket 31 comprises a clamp 84 made of metal, plastic, or plastic with a spring steel core; the clamp 84 is either bonded or removably fastened to said back surface and provided with two (2) or more apertures 91, each intended to receive a commercially available bolt made of metal or plastic, the function of which being, in conjunction with a corresponding wing nut 48, to tighten the clamp 84 against a suitable member of the child carriage 94. One (1) leg of the "U"-shape of the universal bracket 31 contains a circular mounting aperture 89, while a corresponding slotted aperture 90 is provided within the opposite leg. The mounting aperture 89 and the slotted aperture 90 are designed to engage threaded pins welded onto corresponding locations onto the exterior of opposite faces of the plenum 41, thereby allowing the plenum 41 to be securely fastened to the universal bracket 31 by engaging a wing nut 48 onto each threaded pin and by tightening said wing nut 48.

Figure 5:
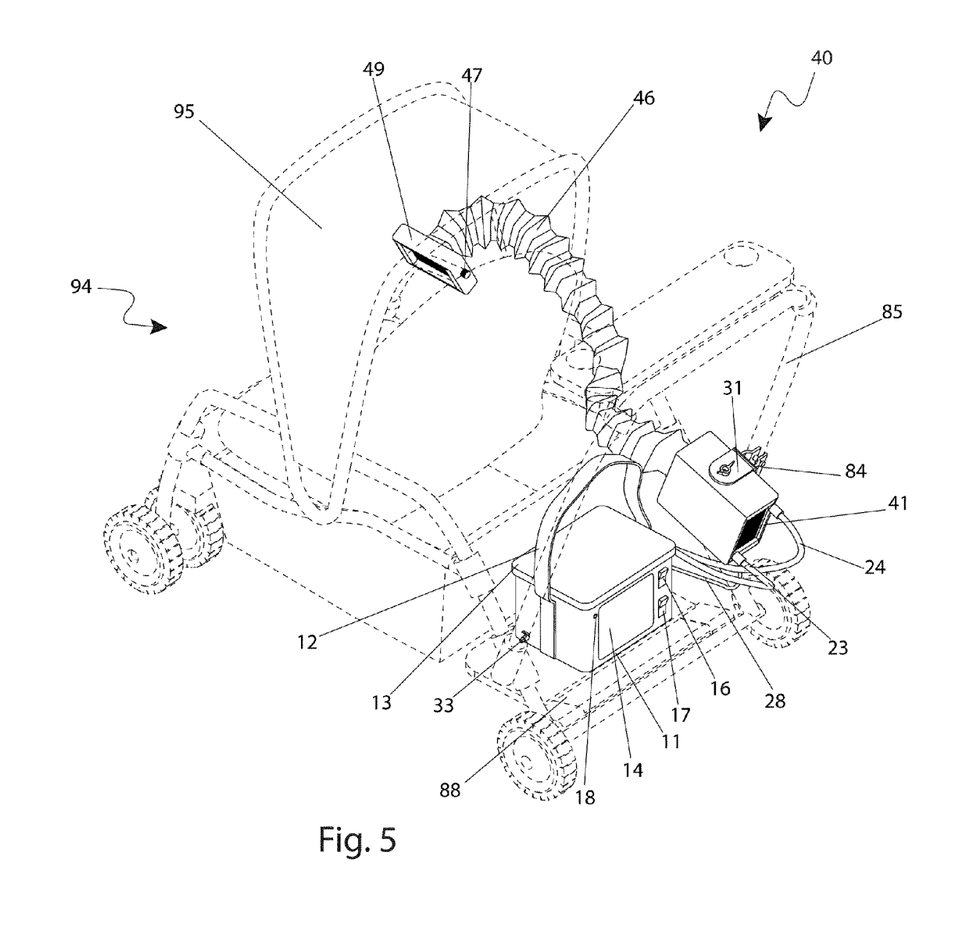
FIG. 5 is a perspective view of the portable air cooling system 10 in the installed state within a child carriage 94, according to the preferred embodiment of the present invention.

Referring now to FIG. 5, a perspective view of the integrated system 10 shown in a state of having been installed on a child carriage 94 according to the preferred embodiment of the present invention, is disclosed. The container portion 11 of the system 10 is shown as securely installed on a tray 88 which is a member that is affixed onto a lower portion of a structure of the child carriage 94, while the air handler portion 40 of the system 10 is shown as securely fastened onto the handle 85 of said child carriage 94 by means of the clamp portion 84 of the universal bracket 31. The flexible duct collar 49 is shown as fastened to the inside of a foldable top 95 of the child carriage 94 by means of the fastener portion 47. It is understood that other suitable locations and orientations of the air handler portion 40 may be found within the confines of the child carriage 94 to be as or more effective, and that only one (1) particular configuration is shown and described herein for purposes of clarity and disclosure and not by way of limitation of scope.

Figures 6A, 6B:
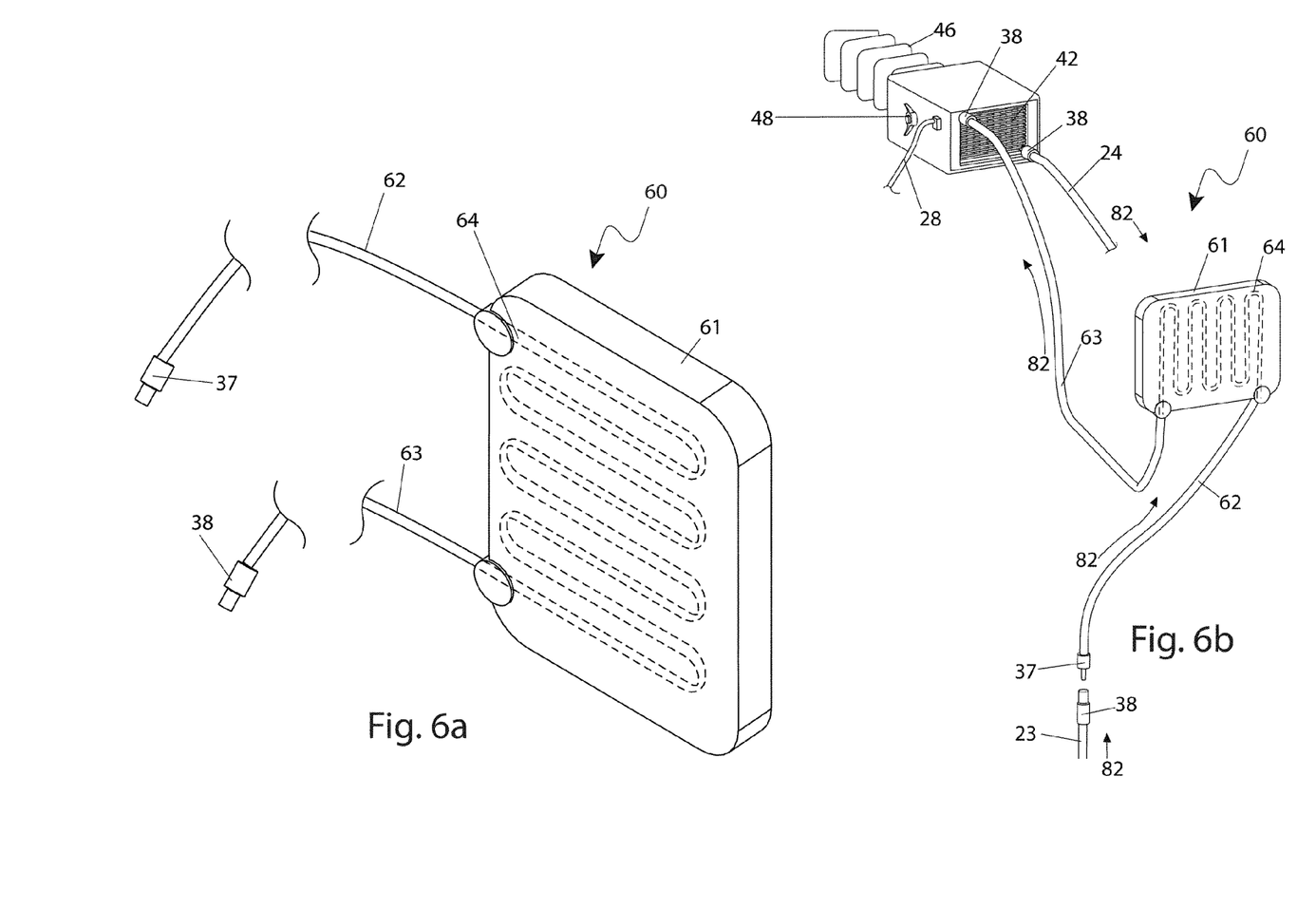
FIG. 6a is a perspective view of a water-cooled blanket embodiment 60 which is an accessory for the portable air cooling system 10, according to an alternate embodiment of the present invention.
FIG. 6b is a perspective view of the water-cooled blanket embodiment 60 in the state of being connected in series within the water supply line 23, according to the alternate embodiment of the present invention.

Referring now to FIG. 6a, a perspective view of a water-cooled blanket embodiment 60 is shown as an accessory to the for the portable integral air cooling system 10. The water-cooled blanket 60 comprises a cushion 61, an inlet 62, an outlet 63, and an internal cooling coil 64. It is envisioned that both the water inlet 62 and the water outlet 63 comprise an appropriate length of tubing to permit the water-cooled blanket 60 to be installed into the system 10 of the preferred embodiment whenever additional cooling comfort is needed by the occupant of the conditioned space. Under such conditions, the water-cooled blanket 60 is to be installed in a series configuration either between the end water supply tubing 23 at the female disconnect 38 and the dehumidifying radiator 42 at the male disconnect 37, or in like manner into the return line, by means of the appropriate disconnects 37 or 38, envisioned to be attached at the ends of the water-cooled blanket 60 inlet 62 and outlet 63 tubing respectively (see FIG. 1). After completing the connections and establishing the circulation of the cold water 82, the water-cooled blanket 60 may be placed either on the seat of the child carriage 94, or behind the back of the occupant of the personal space, or in any other location where additional cooling may be needed either by radiation or by direct contact.

Referring now to FIG. 6b, a perspective view of the water-cooled blanket 60 accessory to the preferred embodiment 10 is disclosed. Said water-cooled blanket 60 is shown as installed in a series configuration between the chilled water 82 supply line 23 and the inlet of the dehumidifying radiator 42. The chilled water 82 is supplied through the supply line 23 by the action of the pump 25 and passes through the cooling coil 64 before entering the dehumidifying radiator 42, from where the chilled water 82 proceeds therethrough the regular circuit comprising the cooling radiators 44 and the return line 24.

Figure 7:
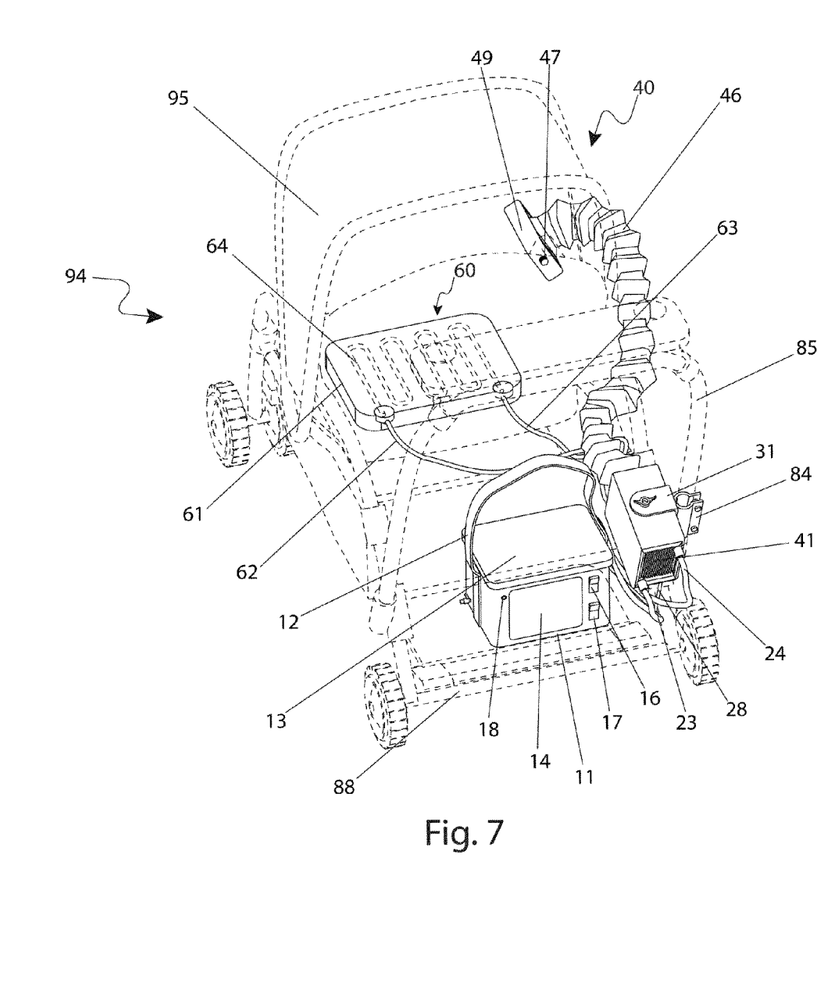
FIG. 7 is a perspective view of the water-cooled blanket embodiment 60 in the installed state within the child carriage 94, according to the alternate embodiment of the present invention.

Referring now to FIG. 7, a perspective view of the water-cooled blanket 60 shown in a state of having been installed within a child carriage 94 as an accessory to the preferred embodiment 10 of the present invention, is disclosed. As shown in greater detail FIG. 6b, the water-cooled blanket 60 is installed within the circuit of the chilled water 82, in series between the supply line 23 and the inlet of the dehumidifying radiator 42, thereby being cooled by the circulation of chilled water 82 through the cooling coil 64. It should be noted that the position of the water-cooled blanket 60 within the child carriage 94 as shown in FIG. 7 is intended as an illustration only and does not in any way limit the location of said water-cooled blanket 60 to any specific area.

Figure 8:
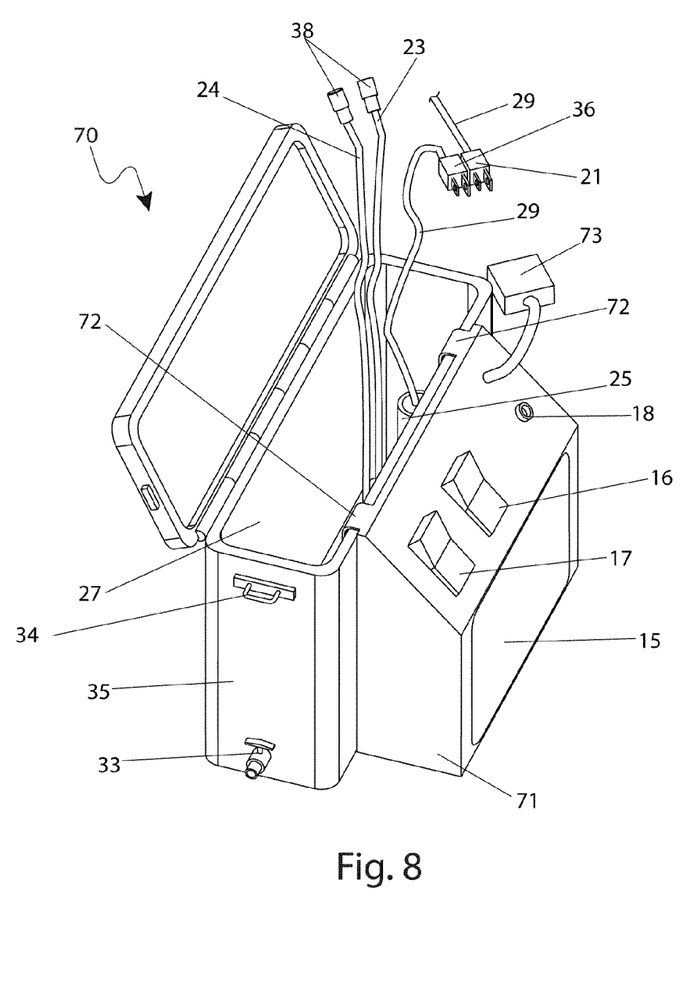
FIG. 8 is a perspective view of a portable modular cooling assembly 70 according to another alternate embodiment of the present invention.

Referring now to FIG. 8, a perspective view of an alternate embodiment of the present invention 70 is disclosed and shown as a modular system whereby the battery pack 14 is housed within a separate enclosure 71, which is removably attached to a state-of-the-art commercially available cooler 35 by means of "J"-shaped brackets 72, which brackets are permanently fastened by either being bonded, welded, rived or integrally molded onto the exterior rear surface portion of the enclosure 71 in an upside-down orientation as shown within FIG. 5. Within this alternate embodiment 70, the fan switch 16, the pump switch 17 and the charging port 18 are located within an upper portion of the enclosure 71. The modular configuration of this alternate embodiment 70 and the removable attachment of the enclosure 71 onto a separate commercially available cooler 75, necessitate the close proximity of a power receptacle 73 to supply the motive power from the battery pack 14 to the water circulating pump 25 and to the air moving fan 43 by way of the fan plug 21 and the pump plug 36. The water supply line 23 and the water return line 34 each comprise one (1) female disconnect 38, also installed in close proximity to the removable enclosure 71.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the system 10, it would be assembled as indicated in FIG. 1.

The method of assembling and utilizing the system 10 may be achieved by performing the following steps: charging the battery pack 14 through the charging port 18, if necessary; affixing the universal bracket 31 to the air handler 40 and fastening the wing nuts 48; installing the air handler 40 onto a child carriage 94 by affixing the universal bracket 31 by means of the clamp 84 onto an appropriate member of a structure of a child carriage 94 or of a personal space; opening the lid 13 of the container 11; priming the system 10 by pouring water 82 into the bottom of the cold compartment 27 to a level above the pump inlet sufficient to initiate the flow of the water 82; filling the balance of said compartment 27 with ice 81; closing the lid 13; connecting the return line 24 tubing to the water return line of the air handler 40 by pushing the female disconnect 38 of said line 24 onto the male disconnect 37 until secure; connecting the water supply line 23 tubing likewise to the inlet of the dehumidifying radiator 42 by pushing the female disconnect 38 of said line 23 onto the male disconnect 37 of the inlet of said radiator 42 until secure; connecting the plug 21 at the end of the fan power line 28 to the fan receptacle 45; moving the pump switch 17 to an "ON" position; ascertaining the flow of the chilled water 82 by feeling the tubing of supply line 23; moving the fan switch 16 to an "ON" position; ascertaining the presence of air flow at the end of the flexible duct 46; directing the air flow to the required area by adjusting and fixing the position of said flexible duct 46 by attaching the fastener portion 47 of the duct collar 49 onto the top inside surface of the foldable top 95 of the child carriage 94 or onto another suitable member of the child carriage 94 or of the personal space; moving the switches 16 and 17 to an "OFF" position when shutting down the system 10; opening the lid 13; draining any remaining water 82 from the cold compartment 27 by means of the drain plug 32; removing the remnants of the ice 81 from the cold compartment 27; disassembling the system 10 in the reverse order of assembly; draining, cleaning and storing various parts within the cold compartment 27 and the storage bin 22; and, closing and securing the lid 13.

The method of assembling and utilizing the water-cooled blanket embodiment 60 as an accessory of the preferred embodiment 10 is achieved by performing the following steps in addition to the steps described herein for the method of assembling and utilizing the system 10: connecting a male disconnect 37 which is fastened at an outer end an inlet 62 tubing of a cushion 61 onto a female disconnect 38 which is fastened onto the outer end of the water 82 supply line 23 tubing; connecting the female disconnect 38 which is fastened onto the outer end of the outlet 63 tubing of the cushion 61 onto the male disconnect 37 of the inlet of the dehumidifying radiator 42, thereby locating the water-cooled blanket 60 in series between the water 82 supply line 23 and the dehumidifying radiator 42.

An alternate embodiment of the present invention 10 is the modular unit 70 as illustrated in FIG. 8 and comprising the separate enclosure 71 which houses the battery pack 14, the on-off switches 17 and 16 which control the operation of the water circulating pump 25 and of the air moving fan 43 respectively. Said enclosure also features the battery charging port 18. This modular embodiment 70 uses the same air handler portion 40 as the preferred embodiment 10, shown in FIGS. 1 and 4a. A commercially available double receptacle provides the electrical connection from the battery pack 14 to the air handler portion 40 and to the pump portion 25, whereby one half (½) portion of said double receptacle 73 supplies the electric power to the air handler fan 43 by means of a commercially available two-pin electric fan plug 21 through the power line 28 and the fan receptacle 45 which is face-mounted on the outside of the plenum 41 of the air handler 40. The pump 25 comprises an integral portion of a modular unit within this embodiment 70, and further is supplied by way of the other half of the dual receptacle 73 and the corresponding two-pin pump plug 36 through the pump power lead 29. The chilled water 82 is supplied from the bottom of the cooler 35 through the supply line 23 to the dehumidifying radiator 42 and thence to the cooling radiators 44 and returned to the bottom of the cooler 35 from the cooling radiator 44 by gravity through the return line 24 tubing. It will be noted that the alternate embodiment 70 uses many of the same components as the preferred embodiment 10 of the present invention, and therefore said components are designated by like numbers. The enclosure 71 of this alternate embodiment 70 is envisioned to be made of a suitable rigid material such as, but not limited to: plastic, fiberglass or aluminum.

Such embodiments and modifications would include, but not be limited to: a low profile wider or dual dehumidifying radiator 42, along with a side by side or "V" disposition of the cooling radiators 44 and a dual side-by-side arrangement of a pair of fans within the air handler 40; a dual air handler 40 where additional cooling capacity is needed, for applications such as but not limited to: a child carriage 94 designed to accommodate twins; a closed cooling loop circuit whereby a coil or a radiator type of heat exchanger would be added within the cold compartment 27 and whereby the cooling action would be achieved indirectly by the crushed ice 81 cooling the water 82 contained within a closed re-circulating loop, while in the preferred embodiment 10 the cooling action is achieved directly by circulating the water produced from the melting ice.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A portable air cooling system for dehumidifying and cooling air to an inside space of a child carriage, said portable air cooling system comprising:
    a container comprising a cold compartment including chilled water stored therein; and,
    an air handler comprising:
        a plenum connected to said container;
        a duct connected to said plenum, said duct having a duct collar connected to an end thereof; and,
        a bracket including a clamp affixed thereto;
        wherein said bracket is adapted to be removably mated to the child carriage for providing dehumidified and cooled air to the child carriage.

2. The portable air cooling system of claim 1, further comprising:
    a dehumidifier located within said plenum;
    a plurality of cooling radiators located within said plenum;
    a supply line extending from said cooling compartment and ending at said plenum;
    a fan positioned between said dehumidifier and said cooling radiators; and,
    a pump connected to said supply line for circulating said chilled water from said cold compartment to said dehumidifying radiator and to said cooling radiators respectively and thereby removing moisture from hot ambient air drawn into said plenum by said fan.

3. The portable air cooling system of claim 2, further comprising: a return line extending from said plenum and ending at said cold compartment respectively such said chilled water returns to said cold compartment by gravity and said dehumidified and cooled air is directed into said duct.

4. The portable air cooling system of claim 3, wherein said bracket comprises: a circular mounting aperture and a corresponding slotted aperture formed therein.

5. The portable air cooling system of claim 4, further comprising: a water-cooled blanket comprising:
    a cushion adapted to be removably positioned on the child carriage;
    an inlet and an outlet; and,
    a cooling coil in fluid communication with said inlet and said outlet respectively;
    wherein said chilled water is supplied through said supply line and passes through said cooling coil before entering said dehumidifying radiator.

6. The portable air cooling system of claim 5, wherein said water-cooled blanket is located in series between said supply line and said dehumidifying radiator such that said water-cooled blanket is cooled by circulation of said chilled water.

7. A portable air cooling system for dehumidifying and cooling air to an inside space of a child carriage, said portable air cooling system comprising:
    a container comprising a cold compartment including chilled water stored therein; and,
    an air handler comprising:
        a plenum connected to said container;
        a duct connected to said plenum, said duct having a duct collar connected to an end thereof; and,
        a bracket including a clamp affixed thereto;
        wherein said bracket is adapted to be removably mated to the child carriage for providing dehumidified and cooled air to the child carriage.

8. The portable air cooling system of claim 7, further comprising:
    a dehumidifier located within said plenum;
    a plurality of cooling radiators located within said plenum;

a supply line extending from said cooling compartment and ending at said plenum;

a fan positioned between said dehumidifier and said cooling radiators; and, a pump connected to said supply line for circulating said chilled water from said cold compartment to said dehumidifying radiator and to said cooling radiators respectively and thereby removing moisture from hot ambient air drawn into said plenum by said fan.

9. The portable air cooling system of claim 8, further comprising: a return line extending from said plenum and ending at said cold compartment respectively such said chilled water returns to said cold compartment by gravity and said dehumidified and cooled air is directed into said duct.

10. The portable air cooling system of claim 9, wherein said bracket comprises: a circular mounting aperture and a corresponding slotted aperture formed therein.

11. The portable air cooling system of claim 10, further comprising: a water-cooled blanket comprising:
    a cushion adapted to be removably positioned on the child carriage;
    an inlet and an outlet; and,
    a cooling coil in fluid communication with said inlet and said outlet respectively;
    wherein said chilled water is supplied through said supply line and passes through said cooling coil before entering said dehumidifying radiator.

12. The portable air cooling system of claim 11, wherein said water-cooled blanket is located in series between said supply line and said dehumidifying radiator such that said water-cooled blanket is cooled by circulation of said chilled water.

13. A method of utilizing a portable air cooling system for dehumidifying and cooling air to an inside space of a child carriage, said method comprising the steps of:
    providing a bracket and an air handler;
    affixing said bracket to said air handler;
    installing said air handler onto the child carriage by affixing said bracket to said child carriage;
    providing a container having a cold compartment and a pump situated therein;
    pouring water into said cold compartment; and,
    filling said cold compartment with ice.

14. The method of claim 13, further comprising the steps of:
    providing an air handler having a dehumidifying radiator and a fan and a plurality of cooling radiators situated in series therein respectively;
    providing and connecting a water return line to said air handler;
    providing and connecting a water supply line to said dehumidifying radiator;
    providing and connecting a duct to said air handler;
    pumping chilled water from said cold compartment to said air handler such that ambient air is dehumidified and cooled after entering said air handler; and,
    directing said dehumidified and cooled air to said inside space of said child carriage via said duct.

* * * * *